Aug. 15, 1967  R. W. CASHMAN  3,335,480
TOOL BIT CLAMP CONSTRUCTION AND METHOD OF MANUFACTURE
Original Filed Sept. 8, 1964  2 Sheets-Sheet 1
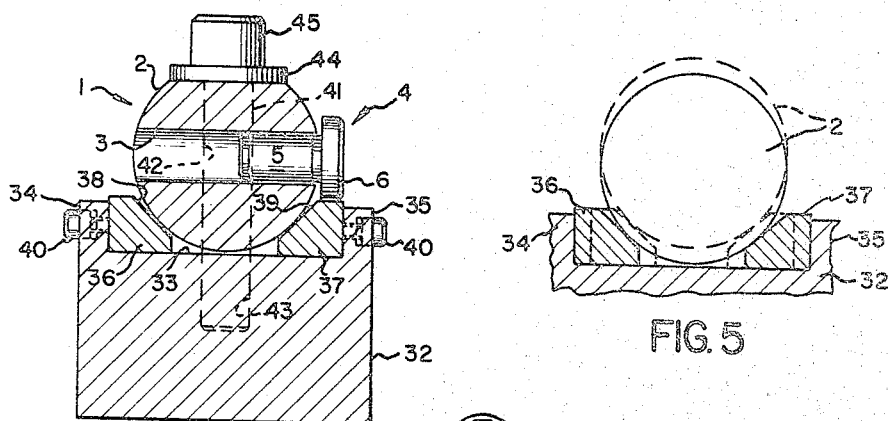
FIG. 4
FIG. 5
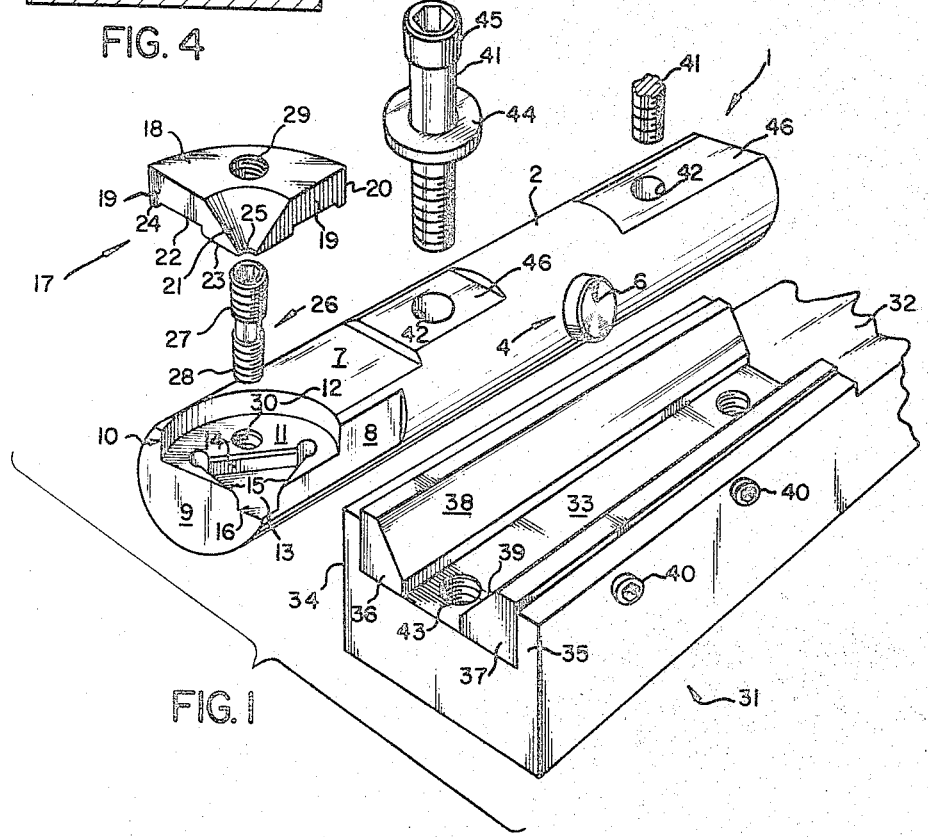
FIG. 1
INVENTOR.
ROBERT W. CASHMAN
BY
*Learman & McCulloch*
ATTORNEYS

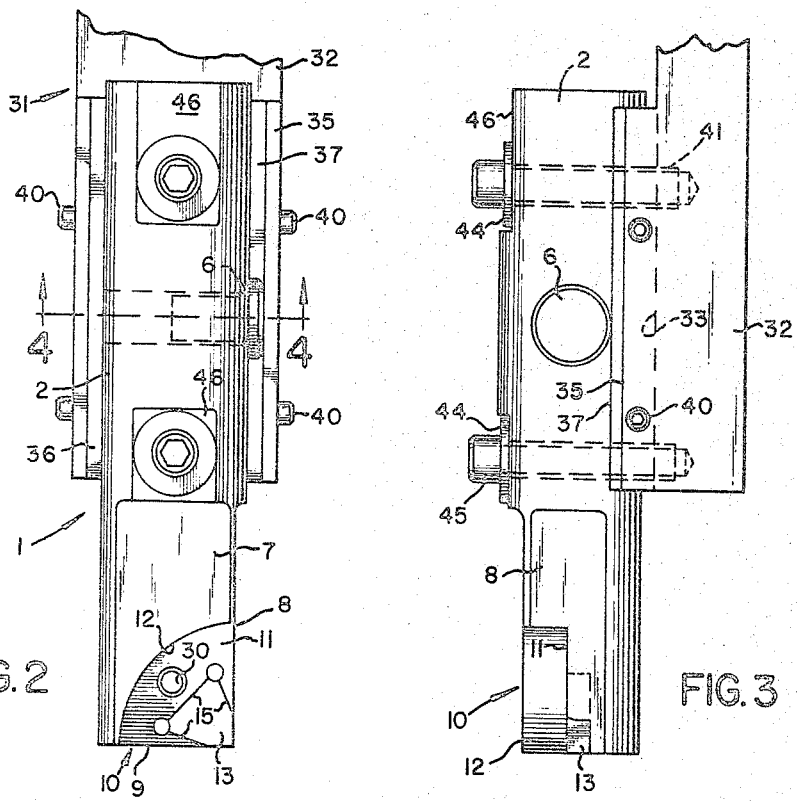

United States Patent Office

3,335,480
Patented Aug. 15, 1967

3,335,480
TOOL BIT CLAMP CONSTRUCTION AND METHOD OF MANUFACTURE
Robert W. Cashman, Saginaw, Mich., assignor to Saginaw Machine & Tool Company, Saginaw, Mich., a corporation of Michigan
Original application Sept. 8, 1964, Ser. No. 394,993. Divided and this application Nov. 23, 1966, Ser. No. 596,516
10 Claims. (Cl. 29—96)

This application is a division of application Ser. No. 394,993, filed Sept. 8, 1964.

This invention relates to tool holders of the kind adapted to accommodate a removable or indexable tool bit, and more particularly to improved clamping apparatus for removably maintaining the bit clamped in the tool holder and to improved methods of manufacturing such apparatus.

In the operation of boring, turning, milling and like machines, it frequently is necessary to effect adjustment or replacement of the cutting tool bit in order to compensate for tool wear and other factors. To adjust or replace an indexable tool bit, it is necessary to adjust or remove the apparatus by means of which the bit is clamped. Some kinds of clamps are relatively complex in construction and operation and their operation frequently requires rather skillful manipulation on the part of the machine operator. In addition the manufacture of such clamps often is a complex undertaking requiring multiple machining operations on relatively small parts.

An object of the invention is to provide a tool holder for an indexable tool bit and provided with clamping means of such construction as to enable the bit positively to be anchored in a fixed position by a single anchoring device.

Another object of the invention is to provide tool bit clamping means which is simple to install on and remove from a tool holder and yet which provides secure clamping of a bit in its holder.

A further object of the invention is to provide a simple and improved method of manufacturing tool bit clamps.

Other objects and advantages of the invention will be pointed out specifically or will become apparent from the following description when it is considered in conjunction with the appended claims and the accompanying drawings, wherein:

FIGURE 1 is a fragmentary, perspective, exploded view of apparatus constructed in accordance with the invention;

FIGURE 2 is a top plan view of a tool holder assembled with its base, but with the tool bit and clamp removed;

FIGURE 3 is a side elevational view of the apparatus shown in FIGURE 2;

FIGURE 4 is a transverse sectional view taken on the line 4—4 of FIGURE 2;

FIGURE 5 is a fragmentary view similar to FIGURE 4, and illustrating the manner in which an adjustment of the tool holder may be made;

FIGURE 6 is a top plan view of a number of clamp members constructed according to the invention; and FIGURE 7 is a sectional view taken on the line 7—7 of FIGURE 6.

Clamp apparatus constructed in accordance with the invention is adapted for use in conjunction with a plurality of tool holders. One such holder is disclosed in the drawings and comprises an elongated body member 1 having a shank portion 2 which preferably is of generally cylindrical configuration so that its sides and bottom present arcuate surfaces. The body member preferably is provided with a transverse bore 3 intermediate its ends for the removable reception of a stabilizing member 4 having a stem 5 frictionally accommodated in the bore 3 and to one end of which is fixed a head 6. The stabilizing member 4 may be inserted into either end of the bore 3 and, if desired, more than one bore may be provided.

One end of the body member 1 preferably is ground to provide a flat upper surface 7, a flat side wall 8, and a flat end surface 9. The upper surface 7 is provided with a segment-shaped recess 10 having a flat base 11 and an arcuate wall 12 which may be formed on the arc of a circle having its center at the intersection of the surfaces 8 and 9.

The base of the recess 10 is provided with a generally triangular cavity 13 having a rear wall 14 and two side walls 15 which converge along lines that intersect beyond the confines of the body 1 so as to provide an opening 16 through which one point of a well known, substantially flat, triangular tool bit (not shown) may project. Tool bits having other geometric shapes may be utilized, in which case the cavity will be shaped accordingly. Preferably, the cavity 13 is constructed in the manner disclosed in United States Patent No. 3,050,828.

Clamp means designated generally by the reference character 17 is provided for releasably clamping a tool bit in the cavity 13. The clamping means comprises a segment-shaped clamp member 18 having two linear side walls 19 joined at corresponding ends by an arcuate wall 20 the curvature of which corresponds as closely as possible to the curvature of the recess wall 12. The correct curvature of the wall 20 may be assured by forming a disk 21 (see FIGURE 6) on the same radius as the radius of the wall 12 and then cutting the disk into four equal segments 18, thereby simultaneously forming four clamp members 17. Preferably, the radially inner portion of the upper surface of the clamp 18 is inclined downwardly as at 21, and the lower surface of the clamp is provided with an arcuate groove 22 so as to form radially inner and outer presser feet 23 and 24, respectively, that are adapted to bear against the tool bit and the recess base 11 when the clamp is in place. The tip of the clamp 18 may be cut away as at 25, if desired. The opposite sides of the disk 21 preferably are machined to form the incline 21 and the groove 22 prior to the cutting of the disk into the four segments.

Means for releasably anchoring the clamp 18 in place comprises an anchor bolt 26 having two axially spaced threaded portions 27 and 28 that are adapted to be engaged with correspondingly threaded openings 29 and 30 provided in the members 18 and 1, respectively. The opening 29 is located on the radius of the clamp 18, and the opening 30 is located on the radius of the arcuate wall 12. The arrangement is such that rocking of the clamp 18 about the axis of the opening 29 is precluded by the engagement between the arcuate walls 12 and 20, thereby enabling a single anchor bolt to maintain the clamp in angularly fixed relation.

The body member 1 and its associated parts correspond to the construction shown in the aforementioned application and are adapted to be removably supported on a base 31 comprising an elongated bar or block 32 which may be a part of a machine, for example, or, if desired, a separate member which may be bolted or otherwise fixed to the machine. In either event, the member 32 preferably has a flat surface 33 located between two upstanding, substantially parallel rails 34 and 35.

Removably and adjustably supported on the surface 33 is a pair of independent, right-angular, generally triangular in cross-section support members 36 and 37, the member 36 abutting the rail 34 and the member 37 abutting the rail 35. The confronting surfaces of the members 36 and 37 preferably are inclined as at 38 and 39, respectively, along lines that converge toward the base 31 and intersect between the support members. The arrangement is such that the support members 38 and 39 define an upwardly diverging V-shaped support for the body member 1.

Means is provided for effecting independent adjustment of the support members 36 and 37 relative to the base 31 and to each other. The adjusting means may comprise a plurality of threaded adjusting screws 40 extending through threaded openings formed in the rails 34 and 35 so as to be capable of effecting movement of the member 36 and 37 toward and away from each other. Preferably, the number and location of the adjusting screws 40 is such as to effect adjustment of the members 36 and 37 angularly, so that they either converge or diverge in a direction from left to right, as is viewed in FIGURE 1.

Means is provided for securing the body member 1 and its associated parts between the support members 36 and 37. The securing means may comprise a suitable number of bolts 41 adapted to extend through bores 42 formed in the body 2 and be received in threaded openings 43 formed in the base member 31. The bores 42 should be slightly greater in diameter than the bolts for a purpose to be explained. Suitable washers 44 may be provided to react between the bolt heads 45 and plane surfaces 46 ground on the body member so as to maintain the latter securely against the support members. In these positions of the parts, the sides of the body member will be in line contact with the surfaces 38 and 39 of the respective support members and the head 6 of the stabilizing device will be in arrangement with the upper surface of the member 37 so as to provide a rigidly supported tool holder which is incapable of rotation in a clockwise direction, as is viewed in FIGURE 4.

In the initial setting up of the tool holder, the sizes of the support members 36 and 37 and the distance they are spaced apart will be determined by the position in which the tool bit is desired to be located. The plane of the tool bit also will be determined by the association between the head 6 and the support member 37.

When it becomes necessary or desirable to effect adjustment of the tool holder, one or more of the adjusting screws 40 may be manipulated, following loosening of the bolts 41, so as to effect an adjustment of the support members 36 and 37, thereby effecting a bodily adjustment of the body 2. Should both support members 36 and 37 be moved toward one another an equal distance so that they remain parallel, the body member 1 will be adjusted vertically in a direction away from the base 33 of the member 31, as is indicated in dotted lines in FIGURE 5. Should only one of the members 36 or 37 be adjusted toward the other, however, and in such manner that the support members remain parallel, the body member will be adjusted not only vertically but laterally in the direction of movement of the adjusted support member. That is, if the member 37 should be moved toward the member 36, the body member 2 will be adjusted both vertically and to the left from the position shown in FIGURE 4. On the other hand, should one or both of the members 36 and 37 be adjusted so that they converge in a direction from right to left, as is viewed in FIGURE 1, the body member 2 will be adjusted so that the end 9 will move upwardly or downwardly away from the base 31. Conversely, adjustment of the members 36 and 37 so that they converge in a direction from left to right, as is viewed in FIGURE 1, will result in adjustment of the body 1 in such manner that the end 9 will move downwardly toward the base.

Any one or all of the adjustments referred to above may be made so as to obtain an extremely precise adjustment of the tool bit relative to a workpiece. Inasmuch as the bores 42 are somewhat larger than the diameter of the bolts 41, it is possible to adjust the body member relatively to the bolts 41. Consequently, the body member is capable of universal adjustment.

Whenever it is necessary to adjust or replace the tool bit, the clamp member 18 may be removed merely by loosening the bolt 26, whereupon the bit may be adjusted in its cavity or replaced entirely. Following adjustment or replacement of the bit, the clamp member may be reassembled with the holder in the manner hereinbefore disclosed.

The disclosed embodiment is representative of a presently preferred form of the invention, but is intended to be illustrative rather than definitive thereof. The invention is defined in the claims.

I claim:
1. A tool holder comprising a body member having a segment-shaped recess therein, said recess having a substantially flat base and an arcuate wall upstanding from said base; a segment-shaped clamp substantially corresponding in size to the size of said recess and having two linear sides joined together at corresponding ends by an arcuate side having a curvature corresponding to the curvature of said arcuate wall, the other ends of said linear sides converging along lines that intersect at the center of a circle on which said arcuate side is formed; and lock means reacting between said members in a position between said other ends of said sides and said arcuate side for releasably locking said clamp member in said recess.

2. The construction set forth in claim 1 wherein said lock means is located midway between the linear sides of said clamp member.

3. The construction set forth in claim 1 wherein the base of said recess has a cavity therein for accommodating a tool bit, and wherein said clamp member overlies said cavity for clamping said bit therein.

4. The construction set forth in claim 1 wherein that surface of said clamp member confronting said base of said recess has a groove therein.

5. The construction set forth in claim 4 wherein said groove lies between the radially inner and outer ends of said clamp member.

6. The construction set forth in claim 1 wherein the radially inner end of said clamp member is recessed.

7. A method forming clamp apparatus for clamping a tool bit in a tool holder, said method comprising forming in said tool holder a recess having an arcuate sidewall; forming a disc having a radius corresponding substantially to the radius of said sidewall; and cutting said disc radially in at least two places to form a segment-shaped member having two opposite sides joined at corresponding ends by an arcuate side.

8. The method set forth in claim 7 including forming an opening in said segment-shaped member on the radius thereof.

9. The method set forth in claim 8 wherein said opening is located midway between the side edges of said member.

10. The method set forth in claim 7 including forming an annular groove in one surface of said disc prior to forming said segment-shaped member.

References Cited

UNITED STATES PATENTS

| 2,704,881 | 3/1955 | Barrett | 29—96 |
| 2,808,638 | 10/1957 | Filippi | 29—96 |

HARRISON L. HINSON, *Primary Examiner.*